United States Patent [19]

Sato

[11] Patent Number: 4,614,196

[45] Date of Patent: Sep. 30, 1986

[54] ULTRASONIC IMAGING APPARATUS USING SCALE CONTROL

[75] Inventor: Minoru Sato, Ootawara, Japan

[73] Assignee: Kabushiki Kaisha Toshiba, Kawasaki, Japan

[21] Appl. No.: 715,154

[22] Filed: Mar. 22, 1985

[30] Foreign Application Priority Data

Mar. 24, 1984 [JP] Japan .................. 59-55267

[51] Int. Cl.[4] .............................................. A61B 10/00
[52] U.S. Cl. .................................. 128/660; 360/27; 358/112
[58] Field of Search ................. 128/660, 661; 358/112; 360/27

[56] References Cited

U.S. PATENT DOCUMENTS

| | | | |
|---|---|---|---|
| 4,111,055 | 9/1978 | Skidmore, III | 73/620 |
| 4,141,347 | 2/1979 | Green et al. | 128/2 V |
| 4,150,403 | 4/1979 | Miller | 360/27 |
| 4,187,857 | 2/1980 | Sato | 128/660 |
| 4,274,422 | 6/1981 | Anderson et al. | 128/661 |
| 4,398,540 | 8/1983 | Takemura et al. | 128/660 |
| 4,423,737 | 1/1984 | Yano et al. | 128/661 |

FOREIGN PATENT DOCUMENTS 0071924 2/1983 European Pat. Off. .
1564610 4/1980 United Kingdom .

Primary Examiner—Kyle L. Howell
Assistant Examiner—Francis J. Jaworski
Attorney, Agent, or Firm—Finnegan, Henderson, Farabow, Garrett & Dunner

[57] ABSTRACT

An ultrasonic imaging apparatus includes an ultrasonic scanner, a TV monitor, a video tape recorder, a video freezing unit, a scale information setter/reader. A tomographic image signal is derived from the ultrasonic scanner and stored in the video tape recorder after being superimposed to the scale information signal derived from the scale information setter/reader. A desirable tomographic image is video-freezed by the video-freezing unit while observing a plurality of tomographic images displayed on the TV monitor. The actual measurement is effected by determining the actual value based upon the scale information previously superimposed to the tomographic video signal.

10 Claims, 3 Drawing Figures

ULTRASONIC IMAGING APPARATUS USING SCALE CONTROL

BACKGROUND OF THE INVENTION

1. Field of the Invention

The present invention relates to an ultrasonic imaging apparatus wherein the scale setting is automatically performed.

2. Description of the Prior Art

A conventional ultrasonic imaging apparatus is known wherein one picture is displayed on a monitor screen as a still image (or "freeze display") by utilizing a video signal recording/reproducing unit such as a video tape recorder, and desired medical information, e.g., a cardiac beat period is obtained from the still image.

Generally, in an imaging apparatus for performing a freeze display of an ultrasonic image recorded in a video signal recording/reproducing unit, one picture of the ultrasonic image represented by a video signal is stored in a memory unit and the picture is displayed on a monitor so as to measure a caliper and an area thereof. During a diagnosis, a number of ultrasonic images are recorded in the video signal recording/reproducing unit, and are reproduced later for measurement.

In the conventional apparatus, in order to measure an ultrasonic image displayed on the monitor, scale information (scale factors and depths of a body) of the ultrasonic image to be measured is supplied to an image measurement circuit in the ultrasonic imaging apparatus through a panel switch or the like. This requires a cumbersome switching operation upon observation of the displayed ultrasonic image. Every time the scale factors of the ultrasonic image to be measured are changed, the cumbersome switching operation must be repeated, which is time-consuming and inconvenient for an operator. In addition, erroneous measurements may be made due to erroneous operation.

Particularly, in M mode operation, it is necessary to determine a depth of an object under examination and time lapse as scale factors. Therefore, the switching operation must be independently performed in accordance with the scale information of each ultrasonic image.

The present invention has as its object to provide an ultrasonic imaging apparatus wherein scale setting for an ultrasonic image displayed on a monitor can be automatically performed, so that a work load for an operator can be reduced, measurement time can be shortened and reliability of measurement results can be improved.

SUMMARY OF THE INVENTION

These objects may be accomplished by providing an ultrasonic imaging apparatus, an ultrasonic scanner including at least a transducer, transmitter/receiver and digital scan converter, for transmitting ultrasonic beams toward an object under examination, for receiving ultrasonic echoes therefrom, for producing an ultrasonic tomographic video signal of the scanned object by converting the ultrasonic echoes of the transducer into the corresponding video signal;

a monitor for displaying an ultrasonic tomographic image of the scanned object by receiving the tomographic video signal derived from the digital scan converter;

a device for setting in the tomographic video signal scale information with respect to the ultrasonic image displayed on the monitor means and for reading the scale information from the tomographic video signal during medical data acquisition;

a scale information setting/reading device for recording the tomographic image signal in which the scale information has been previously set by the scale information setting/reading device; and a video freezing unit for temporarily storing at least the tomographic video signal containing the scale information so as to perform the video-freezing to a desirable tomographic image by monitoring the tomographic images displayed on the monitor, whereby from the video-freezed tomographic image, the desirable medical data can be acquired by measuring in the scale information setting/reading device actual scale information of the scanned object based upon the previously-set scale information in the scale information setting/reading device.

BRIEF DESCRIPTION OF THE DRAWINGS

For a better understanding of these and other objects of the present invention, reference is made to the following detailed description of the invention to be read in conjunction with the following drawings, in which.

DETAILED DESCRIPTION OF THE PREFERRED EMBODIMENTS

Figure 1:
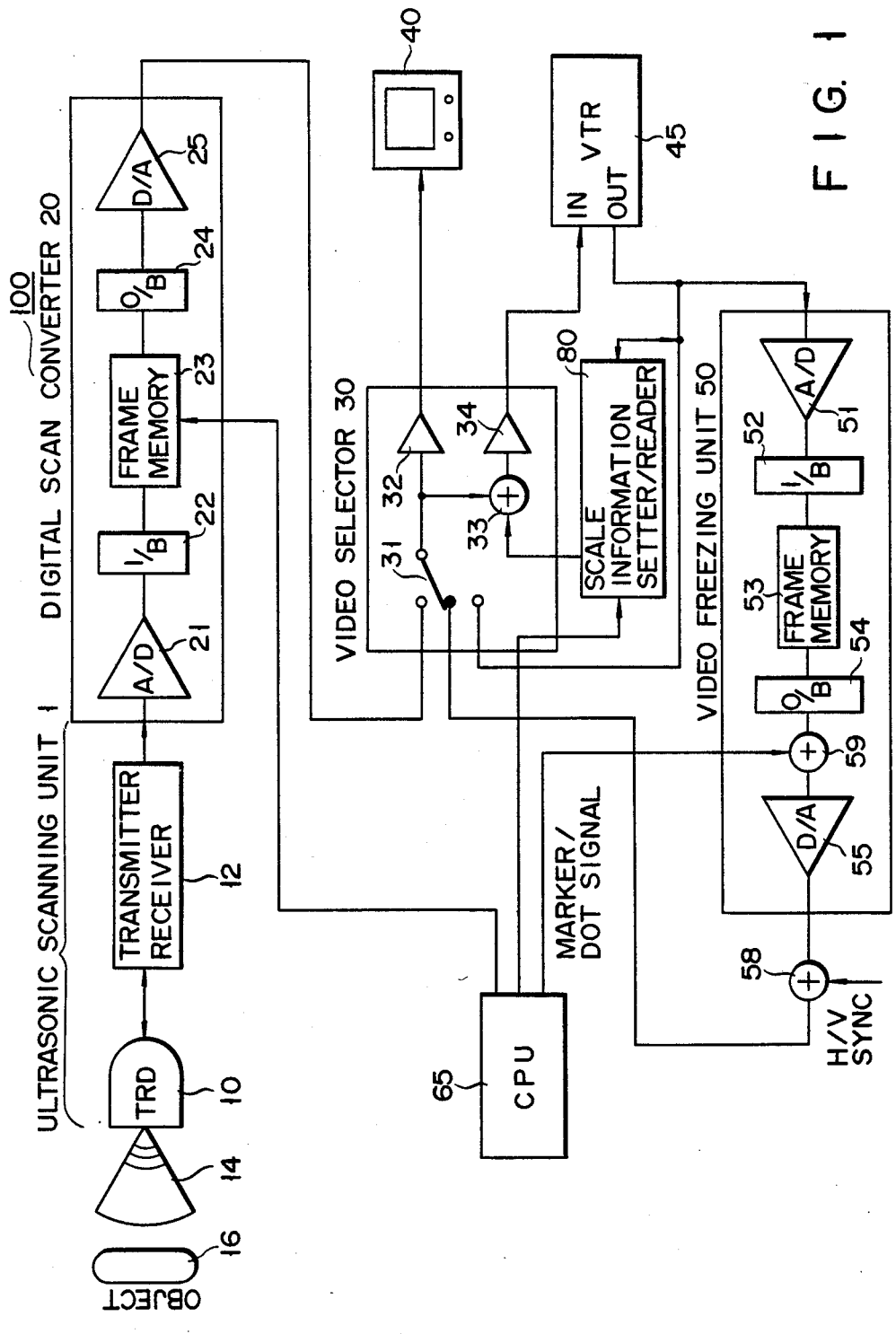
FIG. 1 is a schematic diagram of an ultrasonic imaging apparatus according to one preferred embodiment.

FIG. 1 is a block diagram of an ultrasonic imaging apparatus according to one preferred embodiment of the present invention. Referring to FIG. 1, an ultrasonic scanner unit 1 is provided. This unit 1 is constructed as follows. A transducer 10 is coupled to a transmitter/receiver 12. The transducer 10 is excited so as to project an ultrasonic beam 14 on an object 16, e.g., a patient. The beam 14 can be generated in various modes. Echoes reflected from the interior of the object 16 are converted into echo signals by the transducer 10. The echo signals are subjected to given processing (e.g., amplification) by the transmitter/receiver 12. The processed analogue echo signals are supplied to a digital scan converter 20. The signals are then converted into digital echo signals by an A/D converter 21, and are stored in a frame memory 23 through an input buffer 22. In accordance with an operation mode, the digital echo signals are read out from the memory 23 through an output buffer 24. The readout signals are converted into analogue signals by a D/A converter 25. The digital scan converter 20 mainly serves to convert the scan mode for display so that input ultrasonic tomographic image signals of the object 16 are temporarily stored in the frame memory so as to be displayed on the monitor such as a television.

The output video signals (analogue ultrasonic tomographic image signals) from the converter 20 are supplied to a video selector 30. The signals are amplified by an amplifier 32 through a switch 31 and are then supplied to a TV monitor 40, thus performing a normal display (in this case, not a still picture, but a motion picture).

Therefore, a normal scanned portion of the object 16 is displayed in motion. For example, motion of a heart can be observed.

The video signals are amplified by another amplifier 34 via a mixer 33 and are supplied to a video tape recorder 45, thereby recording the video signals. The video signals reproduced from the VTR 45 can be displayed on the TV monitor 40 via the switch 31 of the video selector 30. The video signals are supplied to a video freezing unit 50 so as to be subjected to freezing, thus obtaining a still picture of the desired tomographic image. The input analogue video signals are converted into digital video signals by an A/D converter 51, and are stored in a frame memory 53 through an input buffer 52. The digital video signals read out from the frame memory 53 through an output buffer 54 are converted into analogue video signals by a D/A converter 55. Horizontal/vertical sync signals are added to the digital video signals by a mixer 58, and the switch 31 of the selector 30 is then operated so as to display them on the TV mpnitor 40 again. In this case, since video signals of a desired image are intermittently and repeatedly read out from the frame memory 53, the video signals are displayed as a still picture.

A main feature of the present invention will be described hereinafter. A scale information setter/reader 80 is provided in the ultrasonic imaging apparatus. The function of the setter/reader 80 will be described in detail later. Briefly, the setter/reader 80 generates a digital signal of information data such as a scale factor representing a ratio of a length of one pixel of the tomographic image displayed on the TV monitor 40 to an actual length of the scanned portion of the object 16. The digital signal is superimposed on an empty portion of the video signal (e.g., a first portion of the frame signal) from the digital scan converter 20 by the mixer 33.

The superimposed video signal is recorded by the VTR 45 and is reproduced. The reproduced video signal (including the scale information data) is supplied to the setter/reader 80 so as to read the scale information data therefrom, thereby obtaining desired medical information (area, size, etc). The obtained medical information can be superimposed on the tomographic image on the TV monitor 40 through the switch 31 of the video selector 30.

A CPU 65 is provided for controlling these circuit elements.

Figure 2:
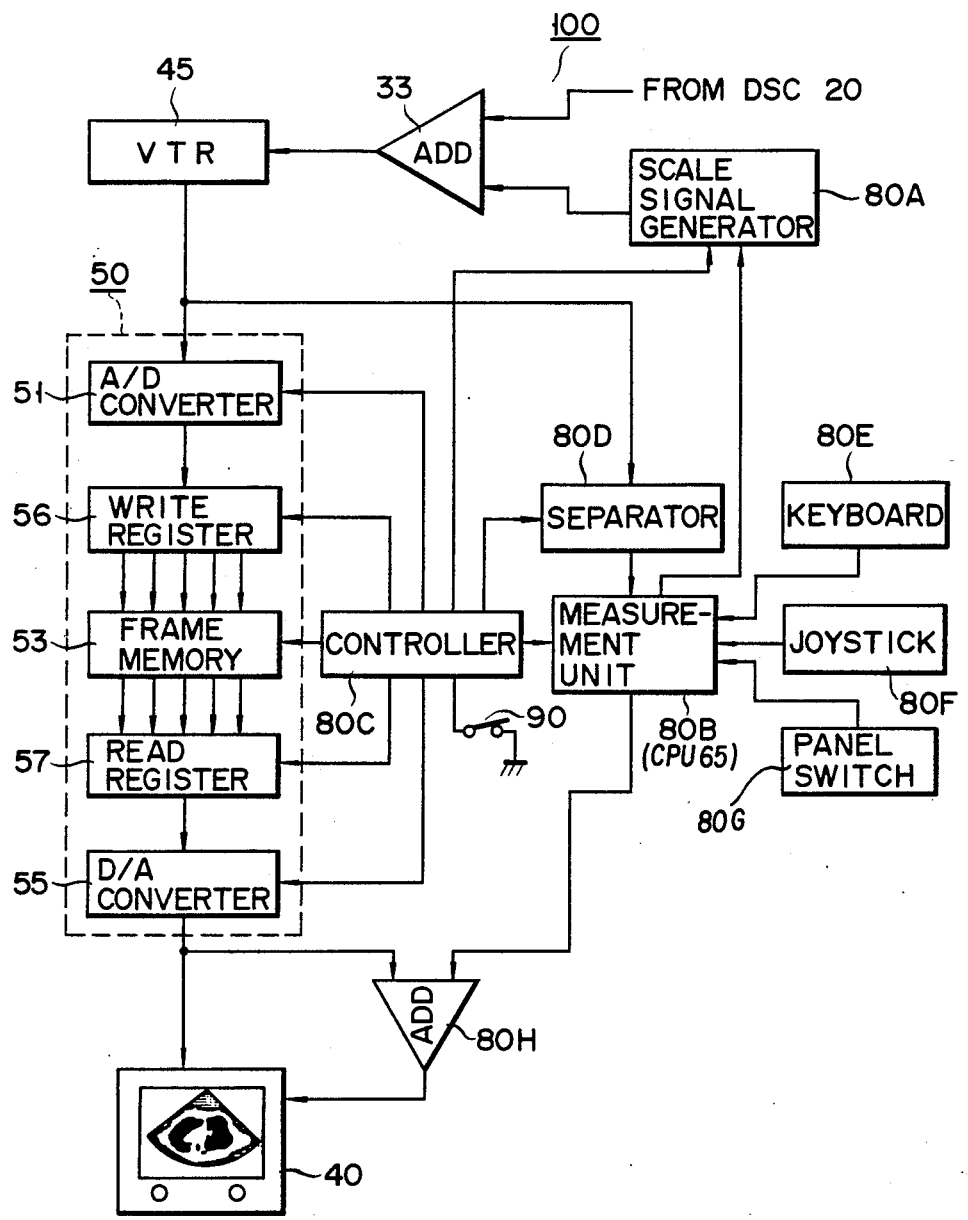
FIG. 2 is a detailed block diagram of the imaging apparatus shown in FIG. 1.

An example of the scale information setter/reader 80 shown in FIG. 1 will be described with reference to FIG. 2. For the sake of simplicity, the setter/reader 80 of FIG. 1 will be described in detail and a description of other circuits will be omitted.

A scale signal generator 80A as a scale information generating means generates a code scale signal of scale information such as an M mode speed or a scale factor representing a ratio of a length of one pixel on the monitor 40 to an actual length of the scanned portion. The scale information is supplied from a keyboard (to be described later), and is encoded by a measurement unit 80B so as to be supplied to the generator 80A. The generator 80A generates the scale information data in accordance with a gate signal from a controller 80C for controlling the ultrasonic imaging apparatus 100. A first adder 33 of the video selector 30 adds the scale information data corresponding to each frame of the ultrasonic image data to the video signal by a time sharing method and generates it. Note that the time sharing method is for superimposing the scale information data on a desired image signal, i.e., a signal portion other than the image data in a 1 TV frame signal. For example, the scale signal is superimposed on a first portion of the 1 TV frame signal. The video tape recorder 45 as the video signal recording/reproducing unit records the output from the adder 33 as a video signal. The output from the VTR 45 is supplied to the video freezing unit 50 and a separator 80D in the scale information setter/reader 80. The video freezing unit 50 receives the output from the VTR 45 and stores one instant frame data of the selected frame so as to perform the video freezing. The video freezing unit 50 comprises the A/D converter 51, a write register 56, the frame memory 53, a read register 57 and a D/A converter 55. The A/D converter 51 converts the video signal from the VTR 45 into digital data at high speed under the control of the controller 80C, and thereafter the digital data is accumulated in the write register 56 at high speed. When the write register 56 accumulates a predetermined amount of the digital data from the A/D converter 51, e.g., 5 pixels, the data for 5 pixels are read out in parallel and at low speed. The write register 56 is also controlled by the controller 80C. The frame memory 53 stores the image data (digital data) for one picture transferred from the write register 56 under the control of the controller 80C in accordance with the operation by an operator of a freezing switch 90, thereby freezing the video signal. The image data for one picture stored in the frame memory 53 is transferred to the read register 57 in parallel and at low speed and is accumulated therein, and thereafter is read out at high speed under the control of the controller 80C. The D/A converter 55 converts the high-speed digital data into analogue data, and adds horizontal/vertical sync signals to the converted data so as to generate a television signal. The television signal is transferred to the TV monitor 40 and is subjected to an image display. The scale information setter/reader 80 measures the image frozen on the TV monitor 40, and, in addition to this, overlays and displays measurement results and measurement information on the frozen image. The setter/reader 80 comprises the separator 80D, an input unit, the measurement unit 80B as a measurement/calculation means and a second adder 80H. The separator 80D receives the video signal from the VTR 45, and separates the scale information data therefrom under the control of the controller 80C so as to generate it. The input unit inputs measurement information for measuring the frozen image on the TV monitor 40, and comprises, e.g., a keyboard 80E, a joystick 80F, and a panel switch 80G. The measurement unit 80B calculates measurement values such as a caliper, an area on the monitor 40 in accordance with the measurement information, and converts the calculated value into an actual value in accordance with the scale information. The unit 80B generates the correct measurement value and the measurement information as a marker signal synchronous with the television signal which is displayed on the picture as dots. The adder 80H receives the television signal from the D/A converter 55 and the marker signal from the measurement unit 80B, and adds the marker signal to the television signal, i.e., the signal portion other than the image data in accordance with the time sharing method so as to display it on the TV monitor 40.

It should be noted that the VTR 45, the video freezing unit 50 and the scale information setter/reader 80 may independently constitute an ultrasonic image reproducing system.

Figure 3:
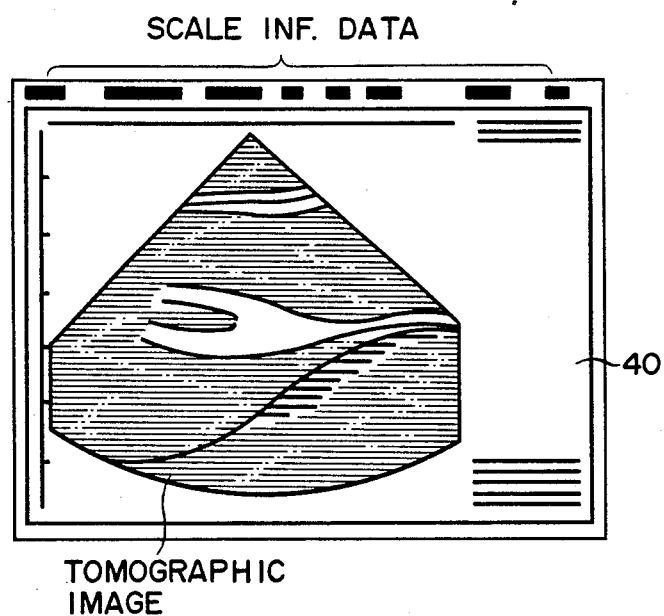
FIG. 3 shows a tomographic image displayed on a monitor together with the scale information data.

Operations of the ultrasonic imaging apparatus 100 with the above arrangement will be described. Ultrasonic image data obtained from the object 16 is acquired by a data aquisition unit in a real time manner so as to obtain a tomographic image signal by the digital scan converter 20. In this case, the operator sets desired scale information by the panel switch 80G. The scale information includes a scale factor representing a ratio of a length of one pixel on the monitor to an actual length of the object, an M mode speed in M mode scan, and the like. The scale information data is supplied to the measurement unit 80B, and is encoded and transmitted to the scale information generator 80A. The first adder 33 adds the ultrasonic image data to the scale information data by the time sharing method. In this case, the generator 80A generates the scale information data in accordance with gating control of the controller 80C. As described above, in the first adder 33, the image data and scale information data are added to each other by the time sharing method so as to have different display ranges, so they are not overlapped when displayed. The output from the adder 33 is stored in the VTR 45 as the video signal. When the above-mentioned operation is intermittently performed, a plurality of ultrasonic image data obtained from a plurality of objects are recorded by the VTR 45. The operator reads out a plurality of images recorded in the VTR 45 after a diagnosis, and measures a caliper and an area of a given portion of the desired image. The video signal stored in the VTR 45 is supplied to the video freezing unit 50, and when the operator operates the freezing switch 90, the desired one frame of the continuous images recorded in the VTR 45 is stored in the frame memory 53. The output from the unit 50 is supplied to the D/A converter 55 so as to be converted into the television signal, thereby being displayed on the screen of the TV monitor 40. On the screen, the reproduced ultrasonic image and the scale information which has been previously superimposed are simultaneously displayed. In addition, since the ultrasonic image data and the scale information data are added to each other by the time sharing method, the scale information can be displayed on a region of the frame other than that for the reproduced ultrasonic image. Therefore, the scale information data will not overlap the image data, and does not interfere with the diagnosis as seen from FIG. 3.

In this embodiment, the precise measurement value and the measurement information are overlaid and displayed on the screen of the TV monitor 40, resulting in convenience for the operator. The video signal from the VTR 45 is also supplied to the separator 80D, and the separator 80D separates only the scale information from the video signal. On the other hand, the measurement information for measuring the frozen image on the monitor 40 is supplied through the keyboard 80E, the joystick 80F and the panel switch 80G of the input unit. In the caliper measurement, measurement information is defined as positions of two points to be measured, and in the area measurement, it is defined as an object's contour. The measurement unit 80B calculates the caliper and area from the measurement information supplied from the input unit on the monitor, and the calculation result is converted into a measurement value of the actual object in accordance with the scale information. The unit 80B generates the measurement value and the measurement information as the marker signal synchronous with the television signal, and the television and marker signals are added by the second adder 80H by the time sharing method. Thus, the measurement value and the measurement information are overlaid and displayed together with the reproduced ultrasonic image on the frame of the TV monitor 40 which is displayed in accordance with the output from the adder 80H. Therefore, the operator can simply observe the screen of the TV monitor 40 so as to obtain all the desired information, thereby greatly shortening the time required for measurement.

Note that the present invention is not limited to the above embodiment, and various changes and modifications may be made within the spirit and scope of the invention.

As described above, according to the present invention, an ultrasonic imaging apparatus can be provided wherein scale information is previously added in a time sharing manner before ultrasonic image data is stored in a video signal recording unit. Therefore, the scale setting on the frame can be automatically performed when the image is reproduced. The conventional complex scale setting required when the image is reproduced can be omitted, resulting in an improvement in operability and in quick measurement. In addition, erroneous measurement due to an erroneous operation can be reduced, thereby improving reliability in measurement results.

Furthermore, when a measurement value is automatically converted into an actual value so as to be displayed on the screen together with the measurement information, time required for measurement can be greatly shortened.

What is claimed is:

1. An ultrasonic imaging apparatus for medically examining a subject, the ultrasonic imaging apparatus comprising:
    means for producing video signals representative of images of the subject under examination;
    scale setting means for producing a scale signal representative of a selected scale;
    video recorder means coupled with said producing means for recording said video signals representative of the images of the subject under examination;
    reproducing means coupled with said video recorder means for generating a play back video signal representative of an image of the subject;
    input means for producing an input measurement signal representative of at least one measurement taken from the subject being investigated;
    measurement means coupled with said scale setting means and said input means for calculating from said scale signal and said input measurement signal a market signal representative of the actual measurement values of the subject being examined; and
    mixing means coupled with said reproducing means and said measurement means for producing a video signal representative of an image of said subject being examined in combination with actual measurement values of the subject being examined.

2. An apparatus according to claim 1, wherein said scale signal is a bar code signal representative of a digital form of said selected scale.

3. An apparatus according to claim 1, wherein said input means includes a joystick.

4. An apparatus as claimed in claim 1, wherein said reproducing means includes:

an A/D converter for converting the video signals derived from said video recorder means into corresponding digital video signals;

a write register for writing the digital video signals;

a frame memory for temporarily storing the digital video signals under control of the write register in a parallel mode;

a read register for cyclically reading the digital video signals from the frame memory; and a D/A converter for converting the digital video signals into corresponding analogue video signals.

5. The ultrasonic imaging apparatus of claim 1, wherein said input means includes a keyboard, a joystick, and a panel switch.

6. An ultrasonic imaging apparatus for medically examining a subject, the ultrasonic imaging apparatus comprising:

transducer means for directing ultrasonic beams toward the subject under examination and for receiving ultrasonic echos of said beams reflected therefrom;

means coupled with said transducer means for processing the ultrasonic echos to obtain video signals representative of images of the subject;

display means coupled with said processing means for displaying said video signals as an image of the subject on a television monitor;

scale setting means for producing a scale signal representative of a selected scale;

first mixing means coupled with said processing means and said scale setting means for producing composed video signals representative of a combination of said video signals and said scale signal;

video recorder means coupled with said first mixing means for recording said composed video signals;

reproducing means coupled with said video recorder means for reading said composed video signals from said video recorder menas, storing said video signals in a frame memory, and selectively reading said stored video signals from said frame memory into a format capable of displaying a play back image on said display means;

scale reader means coupled with said first mixing means for separating said scale signal from said composed video signals;

input means for producing an input measurement signal representative of at least one measurement taken from the subject being examined;

measurement means coupled with said scale reading means and said input menas for calculating from said scale signal and said input measurement signal a marker signal representative of the actual measurement values of the subject being examined; and second mixing means coupled with said reproducing means, said measurement means, and said display means for producing a video signal representative of the image of an image of the subject being examined incombination with actual measurement values of the subject being examined and for transferring the produced video signal to said display means;

whereby an operator can obtain and view on the display means an image of the subject being examined and actual measurement values of the subject.

7. An apparatus according to claim 6, wherein said scale signal is a bar code signal representative of a digital form of said selected scale.

8. An apparatus according to claim 6, wherein said input means includes a joystick.

9. An apparatus as claimed in claim 6, wherein said reproducing means includes:

an A/D converter for converting the video signals derived from said video recorder means into corresponding digital video signals;

a write register for writing the digital video signals;

a frame memory for temporarily storing the digital video signals under control of the write register in a parallel mode;

a read register for cyclically reading the digital video signals from the frame memory; and a D/A converter for converting the digital video signals into corresponding analogue video signals.

10. The ultrasonic imaging apparatus of claim 6, wherein said input means includes a keyboard, a joystick, and a panel switch.

* * * * *